United States Patent
Narisetty et al.

(10) Patent No.: US 11,276,302 B2
(45) Date of Patent: Mar. 15, 2022

(54) TRAFFIC MONITORING APPARATUS AND METHOD OF USING THE SAME

(71) Applicant: NEC Corporation, Tokyo (JP)

(72) Inventors: Chaitanya Prasad Narisetty, Tokyo (JP); Tomoyuki Hino, Tokyo (JP); Akihiro Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 84 days.

(21) Appl. No.: 16/777,803

(22) Filed: Jan. 30, 2020

(65) Prior Publication Data

US 2021/0241615 A1 Aug. 5, 2021

(51) Int. Cl.
  *G08G 1/01* (2006.01)
  *G01H 9/00* (2006.01)
  *G08G 1/04* (2006.01)

(52) U.S. Cl.
  CPC .......... *G08G 1/0145* (2013.01); *G01H 9/006* (2013.01); *G08G 1/0129* (2013.01); *G08G 1/0141* (2013.01); *G08G 1/04* (2013.01)

(58) Field of Classification Search
  CPC .. G08G 1/0145; G08G 1/0141; G08G 1/0129; G08G 1/04; G01H 9/006; G01H 9/004
  See application file for complete search history.

(56) References Cited

U.S. PATENT DOCUMENTS

| 5,801,647 A | * | 9/1998 | Survo | G08B 19/02 250/574 |
| 2016/0275788 A1 | * | 9/2016 | Wu | G08G 1/02 |
| 2018/0342156 A1 | * | 11/2018 | Martin | G08G 1/0145 |

FOREIGN PATENT DOCUMENTS

| JP | H6-28595 A | 2/1994 |
| JP | WO2006/109798 A1 | 11/2008 |
| JP | 2009-98832 A | 5/2009 |
| JP | 2018-205970 A | 12/2018 |

* cited by examiner

*Primary Examiner* — Brian Wilson
(74) *Attorney, Agent, or Firm* — Hauptman Ham, LLP (57) ABSTRACT

A traffic monitoring apparatus includes a distributed acoustic sensor (DAS) for acquiring waterfall data, wherein the waterfall data includes a generation position of a vibration on a roadway adjacent to the DAS, a generation time of the vibration and an amplitude of the vibration. The traffic monitoring apparatus further includes a processor connected to the DAS. The processor is configured to receive the waterfall data from the DAS. The processor is further configured to preprocess the waterfall data. The processor is further configured to separate the preprocessed waterfall data into a plurality of patches, wherein a size of each patch of the plurality of patches is determined based on a parameter of the roadway. The processor is further configured to process each of the plurality of patches to estimate at least one traffic flow property of the roadway.

20 Claims, 7 Drawing Sheets

TRAFFIC MONITORING APPARATUS AND METHOD OF USING THE SAME

RELATED APPLICATION

This application relates to International Patent Application No. PCT/JP2019/026131, the disclosure of which is herein incorporated in its entirety.

BACKGROUND

Optical fibers are present along numerous roadways. Distributed acoustic sensors (DASs) attached to these optical fibers are able to detect vibrations where the optical fibers are located. In some instances, these vibrations are the result of passing vehicles. DASs are able to collect data related to a number of vehicles, lane location of vehicles and vehicle speed.

DASs generate waterfall data based on time and distance in order to determine traffic parameters. An ability of DASs to detect individual vehicles is related to an amount of noise in a signal detected by the DAS.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
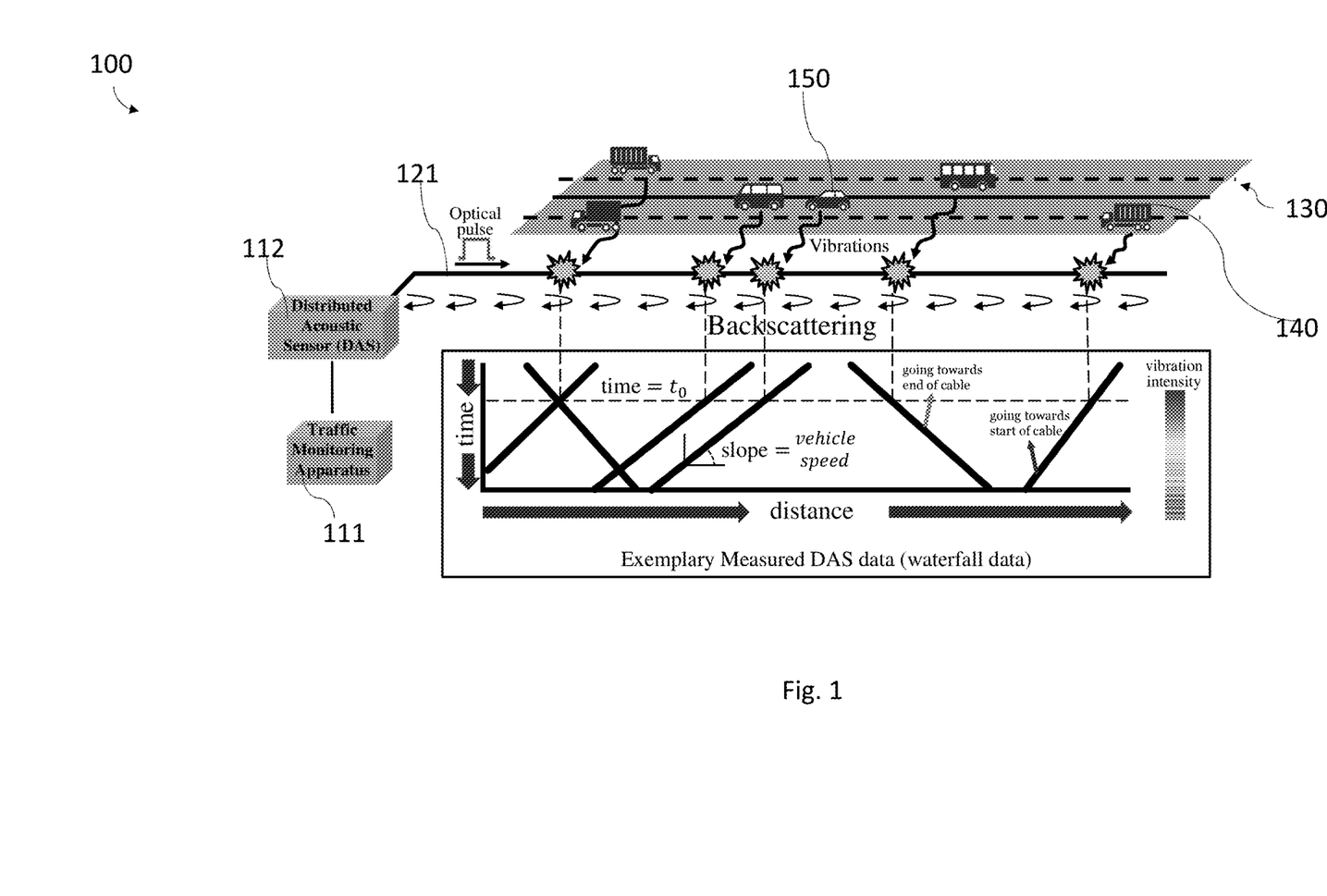
FIG. 1 is a schematic view of a distributed acoustic sensor (DAS) system along a roadway in accordance with some embodiments.

FIG. 1 is a schematic view of a distributed acoustic sensor (DAS) system 100 along a roadway 130 in accordance with some embodiments. DAS system 100 includes a traffic monitoring apparatus 111 in communication with a DAS 112. DAS system 100 further includes an optical fiber 121 connected to DAS 112. Optical fiber 121 is along roadway 130. Roadway 130 includes three lanes. Numerous vehicles are on roadway 130. Some vehicles 140 on roadway 130 are larger than other vehicles 150 on roadway 130.

As vehicles 140 and 150 pass along roadway 130 the vehicles generate vibrations. These vibrations change a manner in which light propagates along optical fiber 121. DAS 112 is connected to optical fiber 121 and sends an optical signal down optical fiber 121 and detects the returned light from optical fiber 121. The resulting data is called waterfall data. The waterfall data provides information related to a number of vehicles, directionality of travel by the vehicles, vehicle speed and lane location of the vehicles on roadway 130.

Roadway 130 in FIG. 1 is on solid ground. Solid ground does not vibrate at a sufficiently high amplitude to obscure detection of vehicles 140 and 150 on traveling along roadway 130. As a result, DAS 112 is able to precisely detect vehicles 140 and 150 traveling along roadway 130. In some embodiments, roadway 130 includes at least one bridge.

Unlike solid ground, bridges vibrate due to wind, passage of previous vehicles and other phenomena. In some instances, the vibration of the bridge is sufficiently high to obscure the vibration generated by a passing vehicle 140 or 150. As a result, monitoring of traffic on a bridge is more difficult than monitoring of traffic along roadway 130 on solid ground.

FIG. 1 also includes exemplary measured DAS data. This exemplary measured DAS data is provided to assist in the understanding of waterfall data collected by DAS 112.

Figure 2:
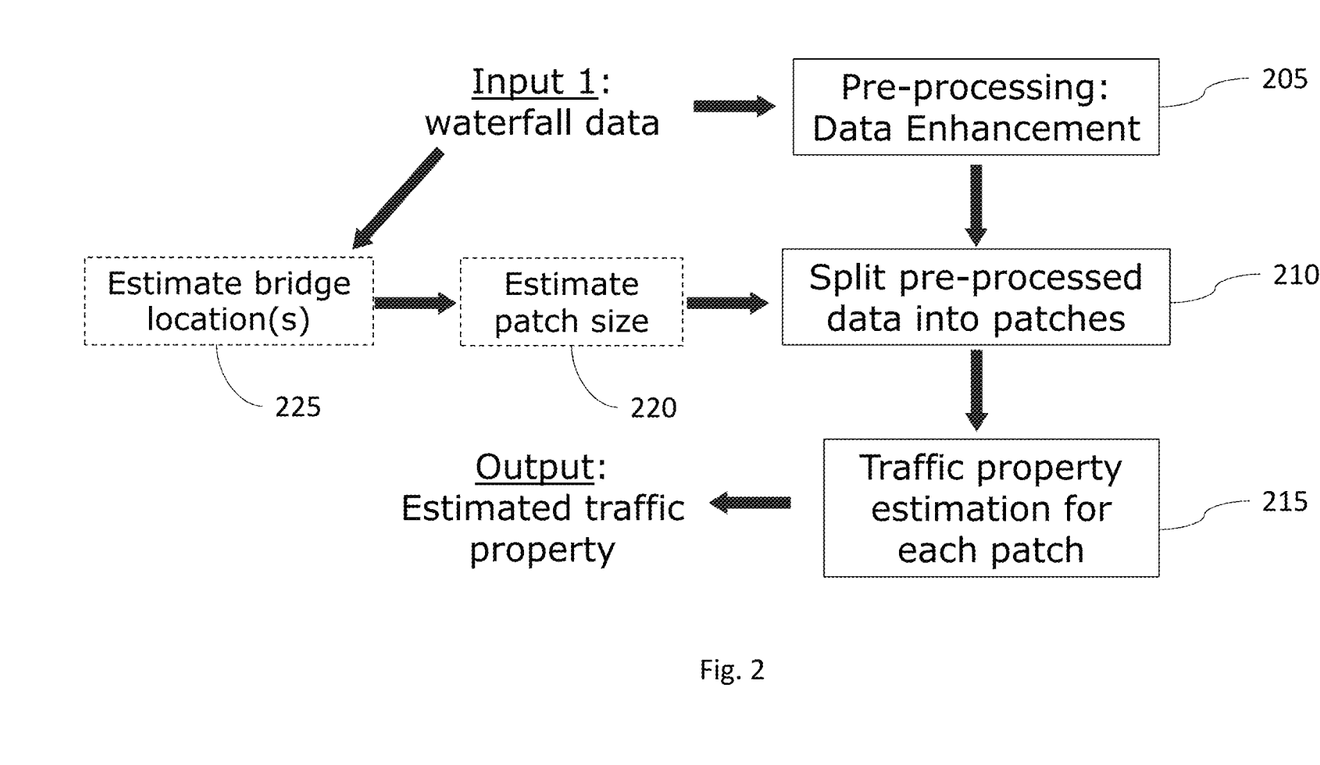
FIG. 2 is a flowchart of a method of monitoring traffic in accordance with some embodiments.

FIG. 2 is a flowchart of a method 200 of monitoring traffic in accordance with some embodiments. Method 200 receives waterfall data, e.g., waterfall data detected by DAS 112 (FIG. 1). Waterfall data includes information related to time and location along the optical fiber at which vibration data is detected. Further details of the waterfall data are discussed with respect to FIG. 3 below. In some embodiments, the waterfall data includes data along a roadway including both solid ground and at least one bridge.

In operation 205, the waterfall data is preprocessed in order to enhance the received waterfall data. Preprocessing the waterfall data includes normalizing vibration amplitude of the waterfall data at each position along a roadway, e.g., roadway 130 (FIG. 1), across a predetermined time duration. Normalizing the vibration amplitude helps to account for variations in sensitivity of the optical fiber. Variations in sensitivity of the optical fiber comes from several sources including, but not limited to, uneven surfaces of the roadway, inconsistent installation of the optical fiber, and inconsistencies in the optical fiber. Normalizing the vibration amplitude also helps to account for variations in traffic volume. For example, as a number of vehicles on the roadway increases, a magnitude of vibrations detected by the DAS will increase. By normalizing the vibration amplitude based on a predetermined time duration, an effect of the large magnitude vibrations detected during high traffic conditions on time periods with low traffic conditions is reduced producing more precise data for estimating traffic flow properties.

In some embodiments, preprocessing the waterfall data also limits a maximum vibration amplitude at each position along the optical fiber for the predetermined time duration. Limiting the maximum vibration amplitude helps to prevent vibrations from large vehicles, such as trucks or construction vehicles, from obscuring vibrations generated by smaller vehicles, such as passenger automobiles.

By preprocessing the waterfall data, individual vehicles along the roadway are more easily identified and tracked in order to more precisely determine traffic flow properties during different time periods.

In operation 210, the preprocessed waterfall data is split into patches. Patches are portions of the overall preprocessed waterfall data. As a size of a patch decreases, resolution of the information obtained from the preprocessed waterfall data increases. For example, a patch having a size of 1 minute by 1 kilometer (km), will product more precise results than a patch having a size of 3 minutes by 1.5 km. However, as a size of the patches decreases processing load on the DAS system, e.g., DAS system 100 (FIG. 1), increases.

In some approaches, a size of patches is uniform across an entirety of the preprocessed waterfall data. The uniform size of patches helps to reduce processing load on the DAS system. However, uniform patch size reduces an ability to target specific portions of the roadway, e.g., roadway 130, to obtain more detailed information. In addition, where the roadway includes at least one bridge, the preprocessed waterfall data provides less usable data in determining traffic flow properties. By having uniform patch sizes, the impact of a bridge on the quality of data in each of the patches is ignored and the data is less useful.

In some embodiments, a size of patches is adjustable. In some embodiments, the patch size is adjusted by changing the distance parameter. For example, a distance in a first patch is 1.5 km, while a distance in a second patch is 1 km. By adjusting the distance parameter for the patch size, specific portions of the roadway are targeted for more precise analysis. Analyzing specific portions of the roadway is helpful for determining, for example, whether to install a traffic light, a frequency of accidents in a specific location, or a location where traffic frequently slows.

In some embodiments, the patch size is adjusted by changing the time parameter. For example, a time in a first patch is 2 minutes, while a time in a second patch is 1 min. By adjusting the time parameter for the patch size, specific times of day are targeted for more precise analysis. Analyzing specific times of days helps to determine how traffic flows during high volume times and low volume times in order to determine, for example, timing of traffic lights, alternative route identification for global position system (GPS) navigation, or construction work timing.

In some embodiments, the patch size is adjusted by changing both the distance parameter and the time parameter. Adjusting the patch size also helps to reduce processing load on the DAS system when a portion of the roadway includes a bridge. For example, if accurate data is not reasonably obtainable for traffic on a bridge, adjusting the patch size to minimize processing load for analyzing the portion of the roadway including the bridge helps to improve the overall speed of the DAS system.

In operation 215, at least one traffic flow property is estimated for each patch. In some embodiments, the at least one traffic flow property is average traffic speed, number of vehicles, speed of each vehicle, a type of vehicle, or direction of each vehicle. In some embodiments, more than one traffic flow property is estimated for each patch. The preprocessed waterfall data includes lines representing vibrations based on both time and location on the roadway. In general, each line represents the trajectory of a single vehicle. In general, a line in the patch need not be a straight line or a connected line. One of ordinary skill in the art would understand that the term 'line' in this description corresponds to and is used interchangeably with the phrase 'trajectory of a vehicle' or 'vibration pattern of a vehicle'. In some embodiments, a line in the patch representing a vehicle trajectory is discontinuous. Such discontinuities arise from a defect in the DAS's measurement, in some instances. Such discontinuities also arise, in some instances, when the vehicle corresponding to a line in the patch stops and then starts again, for example, when a hybrid vehicle engine stops and re-starts. In the time range where a vehicle stops at a location and then starts again, the vehicle does not create a vibration and such an occurrence is observable as a discontinuity in the patch. The traffic flow property is estimated based on a number of lines in the patch, a slope of the line in the patch, an amplitude of vibration of the line in the patch and a thickness of the line in the patch.

As the number of vehicles traversing a distance range of the roadway increases, a number of lines within the distance range increases. That is, a high concentration of lines indicates high traffic volume. As a speed of the vehicle increases, a slope of the line decreases (becomes more horizontal). The low slope of the line indicates that the vehicle has traveled a long distance on the roadway in a short period of time. A vehicle moving toward the DAS, e.g., DAS 112 (FIG. 1), produces a line having a negative slope (rising from right to left in the preprocessed waterfall data). A vehicle moving away from the DAS produces a line having a positive slope (falling from right to left in the preprocessed waterfall data). A thickness of a line indicates the dimension of a vehicle. A total vibration amplitude of a line at a location indicates a magnitude of the vibration generated by the vehicle as it crosses over said location. For example, a large vehicle, such as a truck, produces a thicker and a large amplitude line in the waterfall data, than a smaller vehicle, such as a passenger automobile.

In some instances, a line having a thickness above a threshold is indicative of an automobile accident. The ability to identify location and frequency of accidents also helps with determining whether to install a traffic light, for example. Real time detection of accidents also helps to re-route vehicles using GPS navigation quicker than waiting for traffic congestion to indicate the presence of an accident.

Method 200 outputs at least one estimated traffic flow property. In some embodiments, method 200 outputs multiple traffic flow properties. In some embodiments, the method 200 outputs the traffic flow property using wireless communication. In some embodiments, method 200 outputs the traffic flow property using wired communication. In some embodiments, the traffic flow property is output periodically, e.g., every minute. In some embodiments, the traffic flow property is output continuously. In some embodiments, the traffic flow property is stored in within the DAS system until a user accesses the DAS system.

In optional operation 220, the patch size is estimated. In some embodiments which do not include optional operation 220, the patch size is set by a user. In some embodiments, optional operation 220 is omitted because, for example, detailed analysis of traffic along the roadway are not desired, traffic flow properties along the roadway are consistent, or a user designates a specific patch size. In some embodiments, the patch size is determined based on known parameters of the roadway, for example, locations of bridges along the roadway. In some embodiments, the patch size is determined based on installation parameters of the installer of the optical fiber.

In some embodiments, information related to the parameters of the roadway is determined based on user input. In some embodiments, information related to the parameters of the roadway is retrieved from a map stored in the DAS system or stored externally with respect to the DAS system. In some embodiments, information related to the parameters of the roadway is retrieved from the optical fiber installer.

In some embodiments, the installation parameters of the optical fiber are retrieved from the optical fiber installer. In some embodiments, the installation parameters of the optical fiber are determined during the preprocessing of the waterfall data in operation 205.

In optional operation 225, a location of a bridge along the roadway is estimated. In some embodiments, optional operation 225 is omitted because, for example, no bridges are located along the roadway or a length of a bridge on the roadway is not sufficient to negatively impact the analysis of method 200. In some embodiments which do not include optional operation 225, the location of the bridge is determined based on a user input. In some embodiments, optional operation 225 determines the location for multiple bridges along the roadway. In some embodiments, the location of the bridge is determined based on the waterfall data. In some embodiments, the location of the bridge is determined based on raw waterfall data. In some embodiments, the location of the bridge is determined based on the preprocessed waterfall data.

In some embodiments, determination of the location of the bridge based on the waterfall data is performed using Fast Fourier Transform (FFT) and thresholding. In some embodiments, determination of the location of the bridge based on the waterfall data is performed using low-pass filtering and thresholding. For example, plotting vibration amplitude versus time is usable for determining the location of the bridge. The vibration amplitude for a bridge is substantially consistent with respect to time because the bridge vibrates due to wind, previous vehicles traversing the bridge and current vehicles traversing the bridge. As a result, the vibration application is substantially consistent. In contrast, the roadway on solid ground will exhibit spikes in vibration amplitude indicating passage of a vehicle along the roadway. By plotting vibration amplitude versus time at various locations along the roadway and identifying locations where the vibration amplitude fails to exceed a predetermined threshold, the location of the bridge is able to be identified. In some embodiments, the predetermined threshold is based on a known vibration amplitude indicating passage of a vehicle along the roadway. In some embodiments, the known vibration amplitude is determined based on empirical data from the roadway or other roadways equipped with a DAS system.

Figure 3:
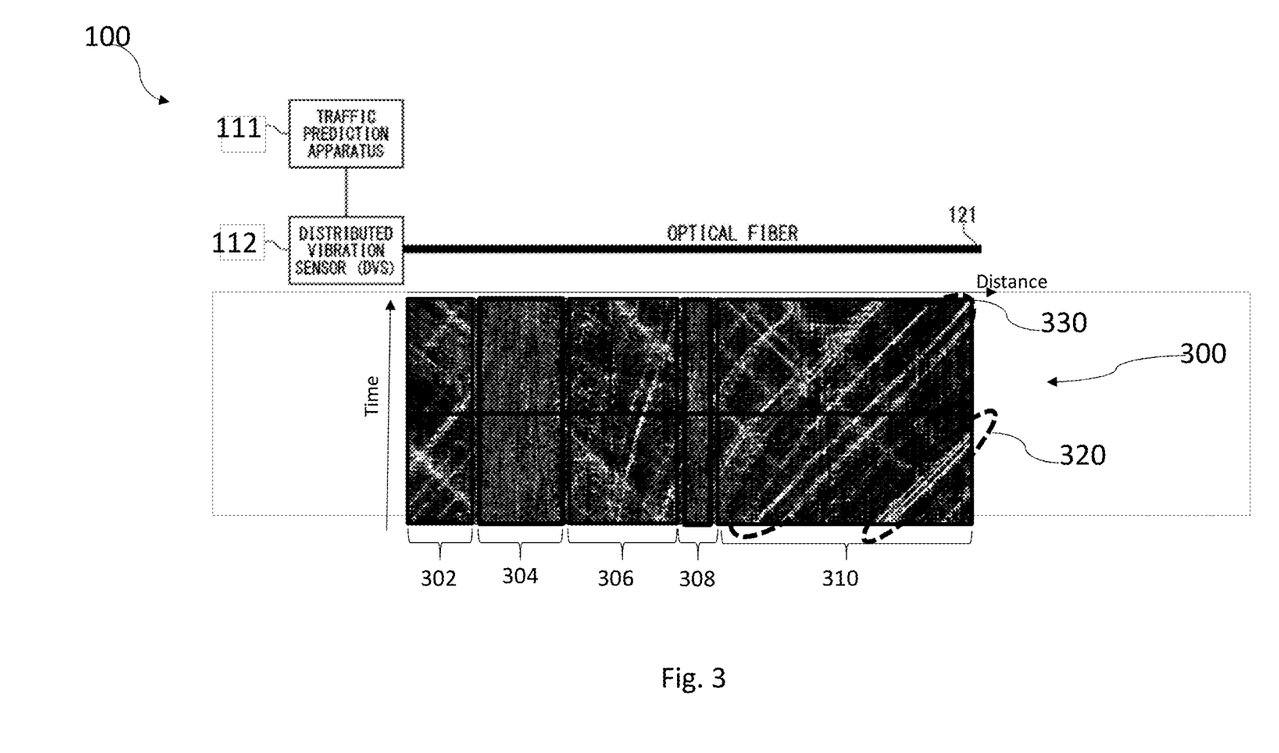
FIG. 3 is a schematic view of a DAS system along with waterfall data collected by the DAS system in accordance with some embodiments.

FIG. 3 is a schematic view of a DAS system 100 along with waterfall data 300 collected by the DAS system in accordance with some embodiments. DAS system 100 is the same as DAS system 100 in FIG. 1. In contrast with FIG. 1, the roadway (not shown) in FIG. 3 includes two bridges, as indicated by waterfall data 300. Waterfall data 300 is preprocessed waterfall data.

Waterfall data 300 includes regions 302, 304, 306, 308 and 310. Regions 302, 306 and 310 include discernable lines indicating vibrations produced by vehicles traversing the roadway. Regions 304 and 308 indicate bridges. In comparison with regions 302, 306 and 310, regions 304 and 308 include no discernable lines because the vibrations of the bridge obscure the detected vibrations of vehicles traversing the bridge.

As noted above, traffic flow properties are determinable based on the lines in the waterfall data 300. Area 320 includes three lines in close proximity to each other. Each of the line represents a vehicle traversing the roadway. Area 330 includes three lines in farther proximity to each other. Area 320 indicates a higher density of traffic on the roadway than area 330. The positive slopes of the lines in both area 320 and area 330 indicate that the vehicles are moving away from the DAS. The magnitude of the slopes in both area 320 and area 330 is similar. This indicates that the speed of the three vehicles indicated by area 320 is similar to the speed of the three vehicles indicated by area 330. In some instances, the similar slope magnitude in two different traffic density areas suggests that the vehicles traversing the roadway proceed at a slow speed that does not significantly change as the density of traffic increases. This type of analysis is usable for estimating a traffic flow property, for example, in operation 215, in some embodiments.

Figure 4:
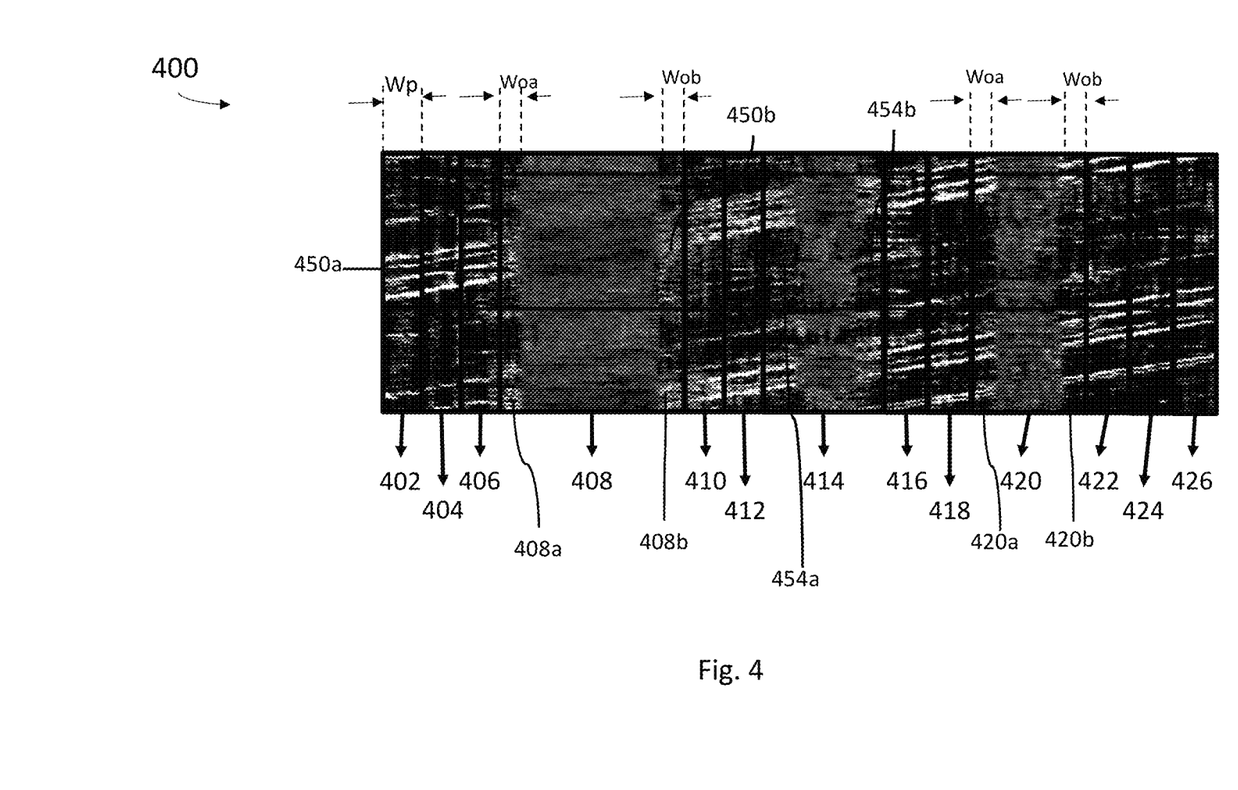
FIG. 4 is a view of waterfall data including patches in accordance with some embodiments.

FIG. 4 is a view of waterfall data 400 including patches 402-426 in accordance with some embodiments. Waterfall data 400 is preprocessed waterfall data. Each of patches 408, 414 and 420 includes a bridge as indicated by the obscured lines indicating vibrations generated by vehicles traversing the roadway. In some embodiments, patches 402, 404, 406, 410, 412, 406, 418, 422, 424 and 426 are collectively referred to as solid ground patches. In some embodiments, patches 408, 414 and 420 are collectively referred to as bridge patches.

Each of the solid ground patches has a patch width Wp. A magnitude of patch width Wp is determined in optional operation 220 in some embodiments. In some embodiments, the magnitude of patch width Wp is determined by a user. In some embodiments, at least one of the solid ground patches has a different patch width that at least one other of the solid ground patches. In some embodiments, the patch width Wp of each of the solid ground patches is determined individually. Determining the patch width of each of the solid ground patches individually increases processing load on the DAS system. However, determining the patch width for each of the solid ground patches individually increases resolution of the output by the DAS system.

One of ordinary skill in the art would recognize that patch width Wp is a division of waterfall data 400 in a distance direction (horizontal direction in FIG. 4). In some embodiments, waterfall data 400 is segmented in the time direction (vertical direction in FIG. 4). In some embodiments, waterfall data 400 is segmented in both the distance direction and the time direction.

Each of the bridge patches has a different width. Each of the bridge patches includes the portion of the roadway occupied by a bridge and overlap regions on both sides of the bridge. For example, patch 408 includes an overlap region 408a on a first side of the bridge and an overlap region 408b on a second side of the bridge. Similarly, patch 420 includes an overlap region 420a on a first side of the bridge and an overlap region 420b on a second side of the bridge. Patch 414 also includes overlap regions which are not labeled in FIG. 4.

Overlap region 408a and overlap region 420a have a first overlap width Woa. Overlap region 408b and overlap region 420b have a second overlap width Wob. Woa is equal to Wob in FIG. 4. In some embodiments, Woa is greater than Wob. In some embodiments, Wob is greater than Woa. In some embodiments, a width of overlap region 408a is different from a width of overlap region 420a. In some embodiments, a width of overlap region 408b is different from a width of overlap region 420b. In some embodiments, Woa and Wob are equal to Wp. In some embodiments, Woa is equal to Wp and Wob is different from Wp. In some embodiments, Wob is equal to Wp and Woa is different from Wp.

In some embodiments, at least one of the overlap regions in the patch is omitted and a side of the bridge is aligned with an edge of the adjacent patch. For example, in some embodiments, overlap region 408a is omitted and an edge of patch 406 is aligned with an edge of the bridge in patch 408. In some embodiments, overlap region 408b is omitted and an edge of patch 410 is aligned with an edge of the bridge in patch 408. In some embodiments, both overlap patch 408a and overlap patch 408b are omitted and the edge of patch 406 is aligned with a first edge of the bridge in patch 408 and the edge of patch 410 is aligned with a second edge of the bridge in patch 408.

Overlap regions, e.g., overlap regions 408a and 408b, help to estimate traffic flow properties on the bridge, e.g., the bridge in patch 408. By comparing the line on a first side of the bridge with a line on the second side of the bridge, the traffic flow property of the bridge is estimated. For example, line 450a in overlap region 408a appears to have a same width and slope as line 450b in overlap region 408b. Therefore, in some embodiments, the traffic flow property on the bridge in patch 408 is considered to be similar to the traffic flow property in overlap region 408a or overlap region 408b. In contrast, line 454a in an overlap region on a first side of the bridge in patch 414 appears to be more horizontal than line 454b in an overlap region on a second side of the bridge in patch 414. Therefore, in some embodiments, the traffic flow property on the bridge in patch 414 is considered to be similar to the traffic flow property of line 454b because traffic exiting the bridge appears to be slower than traffic entering the bridge.

In embodiments which do not include at least one overlap region, the traffic flow property on the bridge is estimated based on a comparison of a traffic flow property in the patch having an edge aligned with an edge of the bridge. For example, in at least one embodiment where overlap region 408a is omitted and the edge of patch 406 is aligned with the edge of the bridge, a comparison is made between a line in patch 406 and the corresponding line in overlap region 408b. One of ordinary skill in the art would recognize that a similar analysis is possible in embodiments where overlap region 408b is omitted and in embodiments where both overlap region 408a and overlap region 408b are omitted.

Figure 5A:
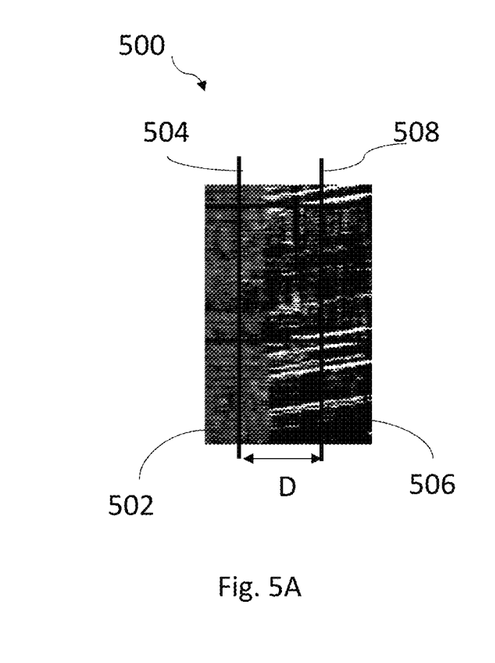
FIG. 5A is a view of waterfall data collected by a DAS system for a bridge and for a roadway on solid ground in accordance with some embodiments.

FIG. 5A is a view of waterfall data 500 collected by a DAS system for a bridge and for a roadway on solid ground in accordance with some embodiments. Waterfall data 500 is preprocessed waterfall data. Waterfall data 500 includes region 502 and region 506. Visual inspection of waterfall data 500 indicates that region 502 indicates a bridge and region 506 indicates solid ground. In some embodiments, optional operation 225 is implemented by visual inspection by a user of the waterfall data and entry of bridge locations.

In some embodiments, optional operation 225 is implemented automatically by a thresholding process. A time line 504 is drawn through region 502 at a specific location and an amplitude of vibration is determined based on the thickness of the lines in the waterfall data 500 along the time line 504. Similarly, a time line 508 is drawn through region 506 at a specific location and an amplitude of vibration is determined based on the thickness of the lines in the waterfall data 500 along the time line 508. These amplitudes are compared with a threshold to determine whether the waterfall data 500 is indicative of a bridge or solid ground.

A distance D between the location sampled by time line 504 and the location sampled by time line 508 is based on a sampling rate of the DAS system. In some embodiments, the distance D ranges from about 1 meter (m) to about 4 m. As a distance D increases, processing load on the DAS decreases, but locating the edge of the bridge becomes less accurate. As a distance D decreases, the edge of the bridge is detected more accurately, but processing load on the DAS system increases. In some embodiments, the sampling rate is increased during optical operation 225 in order to accurately determine the location of the edge of the bridge, then the sampling rate is reduced during normal operation of the DAS system.

Figure 5B:
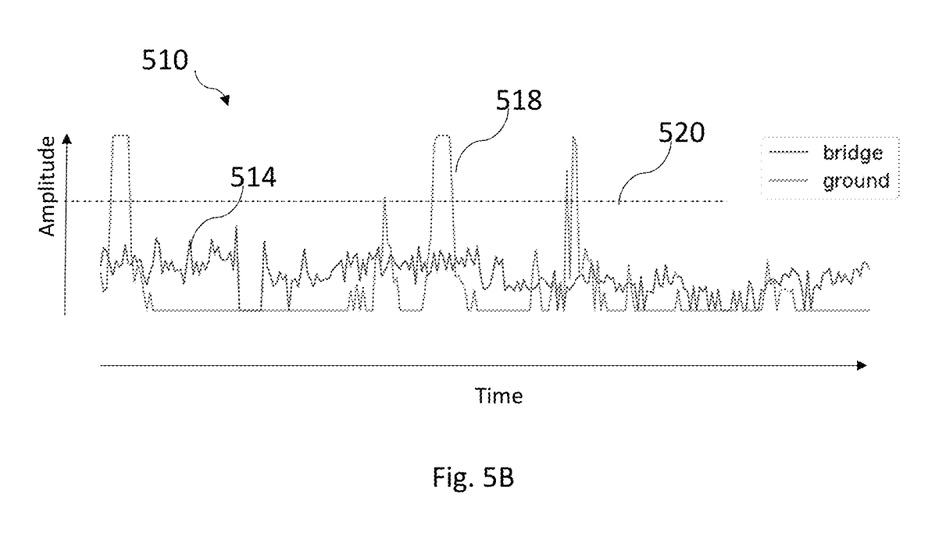
FIG. 5B is a graph of vibration amplitude versus time for the waterfall data in FIG. 5A in accordance with some embodiments.

FIG. 5B is a graph 510 of vibration amplitude versus time for the waterfall data 500 in FIG. 5A in accordance with some embodiments. Graph 510 includes line 514 corresponding to the vibration amplitudes along time line 504 in FIG. 5A. Graph 510 includes line 518 corresponding to the vibration amplitudes along time line 508 in FIG. 5A.

A variation of vibration amplitude of line 514 is substantially constant with few if any spikes in vibration amplitude. In contrast, line 518 includes several significant spikes in vibration amplitude. These spikes in vibration amplitude correspond to the times at which a vehicle passes along the roadway. By comparing the vibration amplitude indicated by line 514 and 518 with a predetermined threshold 520, the DAS system is able to automatically determine whether the location corresponding to time line 504 or the location corresponding to time line 508 is on a bridge or on solid ground. A value of the predetermined threshold 520 is determinable as discussed above with respect to FIG. 2.

Figure 6A:
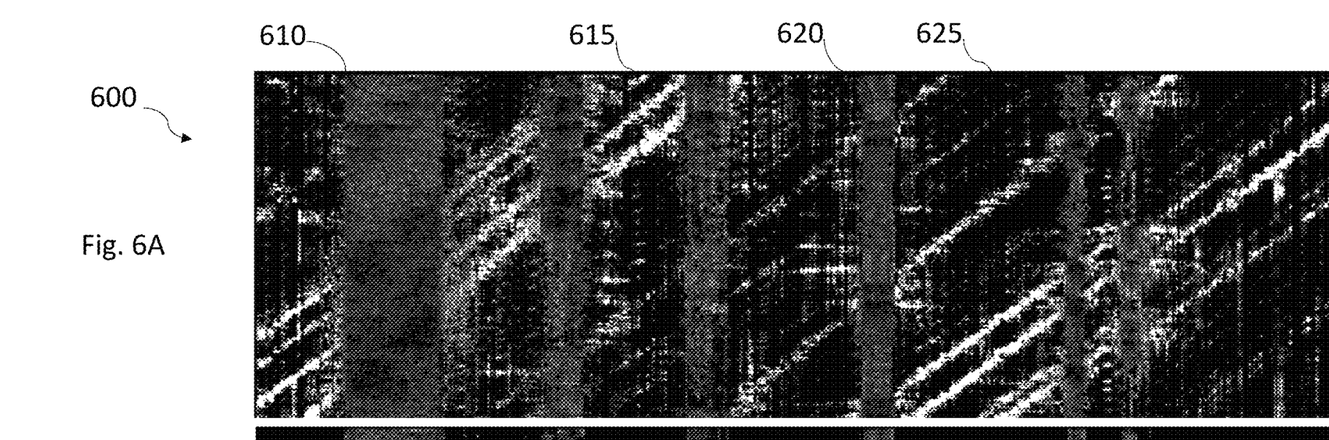
FIG. 6A is a view of waterfall data collected by a DAS system in accordance with some embodiments.

FIG. 6A is a view of waterfall data 600 collected by a DAS system in accordance with some embodiments. Waterfall data 600 is preprocessed waterfall data. Waterfall data 600 includes region 610 and region 620 indicating a bridge due to the obscuring of vibration lines from passing vehicles. Waterfall data 600 includes region 615 and region 625 indicating solid ground due to the easily identifiable vibration lines from passing vehicles.

Figure 6B:
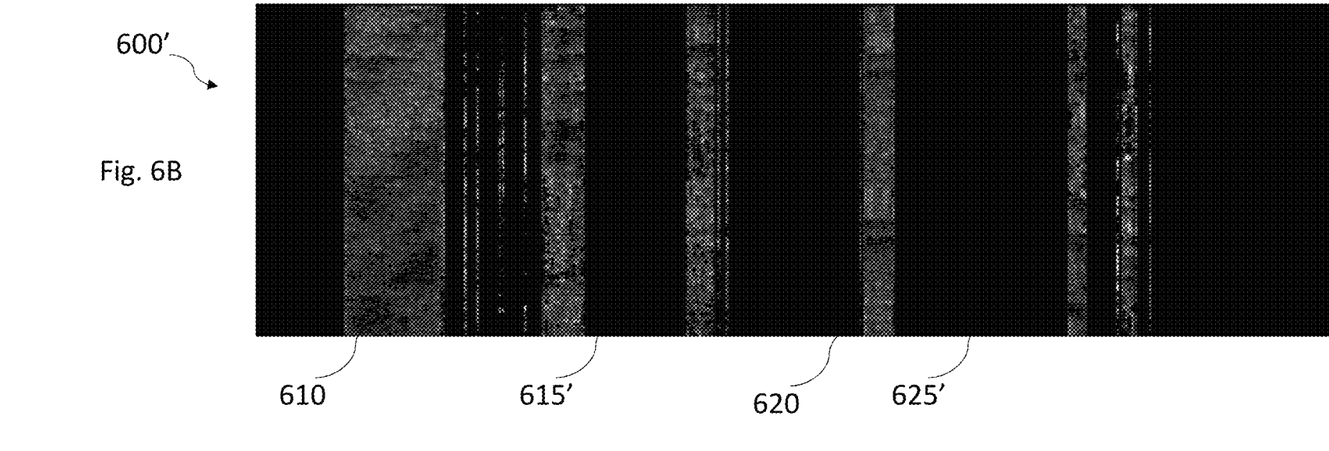
FIG. 6B is a view of modified waterfall data based on the waterfall data in FIG. 6A in some embodiments.

FIG. 6B is a view of modified waterfall data 600' based on the waterfall data 600 in FIG. 6A in some embodiments. In comparison with waterfall data 600, waterfall data 600' was subjected to a thresholding process. Waterfall data 600' still includes region 610 and region 620 indicating a bridge. However, waterfall data 600' includes region 615' and region 625' which are substantially free of vibration. As a result, region 615' and region 625' are substantially blank. Comparing the blank data in regions 615' and 625' with the regions 610 and 620 helps to clearly identify the location of bridges from the waterfall data 600'. In some embodiments, optional operation 225 is implemented using the thresholding process indicated in FIGS. 6A and 6B.

Figure 7:
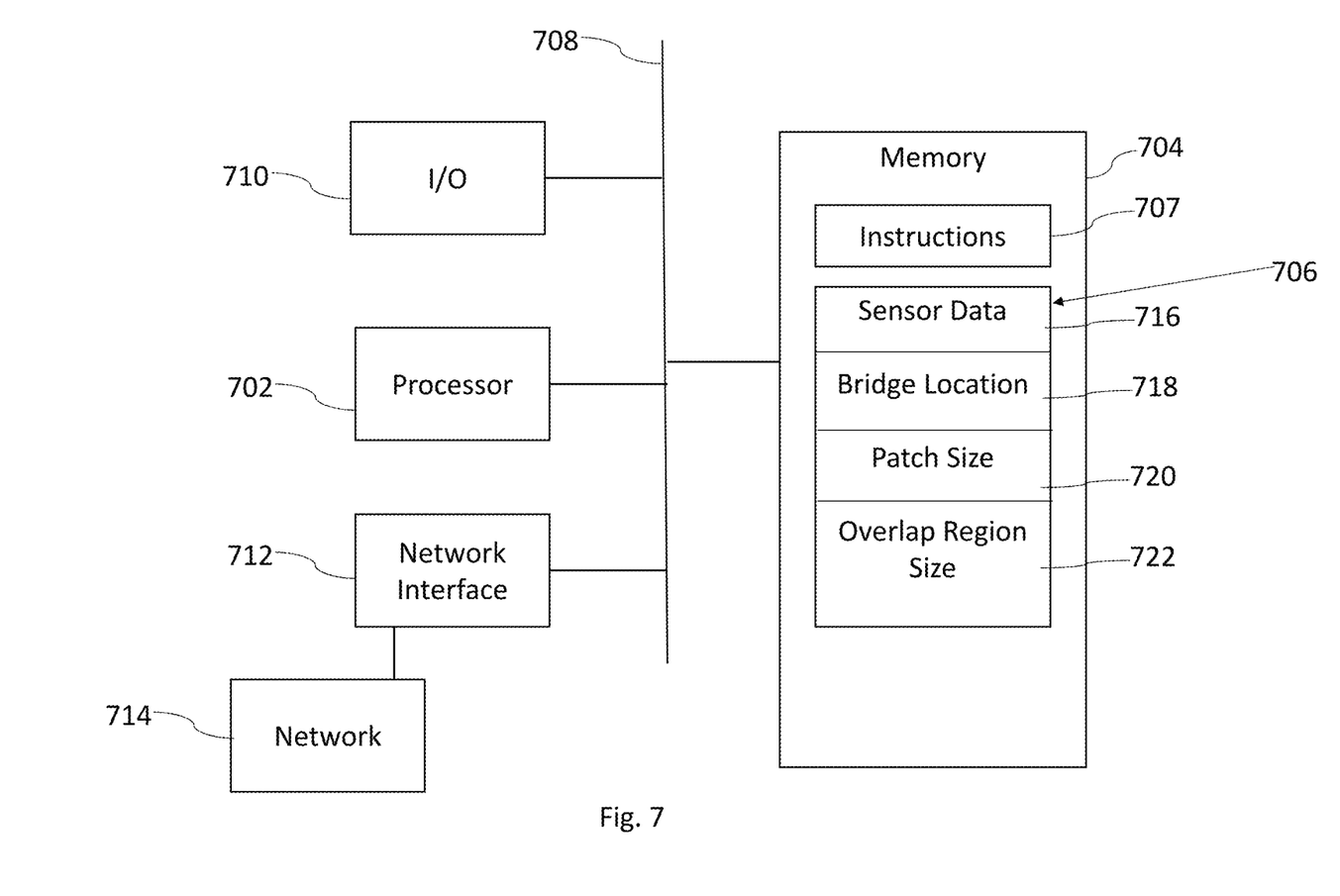
FIG. 7 is a block diagram of a system for analyzing waterfall data in accordance with some embodiments.

FIG. 7 is a block diagram of a system 700 for analyzing waterfall data in accordance with some embodiments. In some embodiments, traffic monitoring apparatus 111 is implemented using system 700. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in method 200.

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform method 200. In some embodiments, the storage medium 704 also stores information needed for performing a method 200 as well as information generated during performing the method 200, such as a sensor data parameter 716, a bridge location parameter 718, a patch size parameter 720, an overlap region size parameter 722 and/or a set of executable instructions to perform the operation of method 200.

In some embodiments, the storage medium 704 stores instructions 707 for interfacing with external devices. The instructions 707 enable processor 702 to generate instructions readable by the external devices to effectively implement method 200.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, method 200 is implemented in two or more systems 700, and information such as sensor data, bridge location, patch size and overlap region size are exchanged between different systems 500 via network 514.

System 700 is configured to receive information related to a waterfall data through I/O interface 710 or network interface 712. The waterfall data is transferred to processor 702 via bus 708 for preprocessing. The preprocessed waterfall data is then stored in computer readable medium 704 as sensor data parameter 716. In some embodiments, system 700 is configured to receive information related to bridge location through I/O interface 710 or network interface 712. In some embodiments, the processor 702 is configured to generate bridge location information based on the sensor data parameter 716. The bridge location information is stored in computer readable medium 704 as bridge location parameter 718. In some embodiments, system 700 is configured to receive information related to patch size through I/O interface 710 or network interface 712. In some embodiments, the processor is configured to generate information related to patch size based on the sensor data parameter 716. The patch size information is stored in computer readable medium 704 as patch size parameter 720. In some embodiments, system 700 is configured to receive information related to overlap region size through I/O interface 710 or network interface 712. In some embodiments, the processor 702 is configured to generate information related to overlap region size. The overlap region size information is stored in computer readable medium 704 as overlap region size parameter 722.

During operation, processor 702 executes a set of instructions to preprocess waterfall data received from a DAS. The processor 702 further executes instructions for manipulating the preprocessed waterfall data using bridge location parameter 718, patch size parameter 720, overlap region size parameter 722 and/or other information in order to estimate at least one traffic flow property for a roadway. Following estimation of the at least one traffic flow property of the roadway, the processor 702 generates instructions for communicating with external devices through I/O interface 710 or network interface 712.

In some embodiments, the external devices use the at least one traffic flow property to determine traffic patterns within a region in a city or town. In some embodiments, the external devices use the at least one traffic flow property to determine whether a vehicle traveling along the roadway is over a weight limit for the roadway, e.g., based on a width and amplitude of the vibration line caused by the vehicle traversing the road. In some embodiments, the external devices use the at least one traffic flow property to develop a navigation plan for a GPS device. In some embodiments, the external devices use the at least one traffic flow property to assist with the routing of emergency vehicles. For example, by generating a navigation plan and/or for specifically identifying a location of a vehicle accident by detecting a large vibration amplitude. In some embodiments, the external devices use the at least one traffic pattern for detecting landslides based on extremely high vibration amplitudes and/or damage to the optical fiber.

In comparison with other approaches, the DAS system 100 used to implement method 200 is able to replace multiple visual monitoring devices, such as cameras, with a single detection system. By using the optical fiber as the measuring instrument instead of visual monitoring devices, wireless communication is avoided. In some instances, wireless communication is interrupted or interferes with other wireless communication devices. Wireless communication also introduces more noise into the signal transmitted than the wired connection provided by the optical fiber. In addition, the DAS system 100 is able to connect to optical fibers which have already been installed along roadways. This minimizes an amount of infrastructure used to install the DAS system 100 and/or implement method 200.

The above description refers to the example of identifying bridges and estimating traffic flow properties related to roadways which include at least one bridge. One of ordinary skill in the art would recognize that the above described principles are also applicable to determining traffic flow properties in tunnels. In contrast to a bridge, a roadway in a tunnel will have dampened vibrations. Thus, instead of a high amount of noise obscuring a signal for a bridge, a tunnel will have reduced signal strength. In both examples, the individual vehicle information is difficult to identify. However, by modifying patch size and establishing overlap regions, as desired, traffic flow properties within a tunnel are still able to be estimated using the above described principles.

Supplemental Note 1

A traffic monitoring apparatus includes a distributed acoustic sensor (DAS) for acquiring waterfall data, wherein the waterfall data includes a generation position of a vibration on a roadway adjacent to the DAS, a generation time of the vibration and an amplitude of the vibration. The traffic monitoring apparatus further includes a processor connected to the DAS. The processor is configured to receive the waterfall data from the DAS. The processor is further configured to preprocess the waterfall data. The processor is further configured to separate the preprocessed waterfall data into a plurality of patches, wherein a size of each patch of the plurality of patches is determined based on a parameter of the roadway. The processor is further configured to process each of the plurality of patches to estimate at least one traffic flow property of the roadway.

Supplemental Note 2

The traffic monitoring apparatus of Supplemental Note 1, wherein the processor is further configured to determine a size for each patch of the plurality of patches.

Supplemental Note 3

The traffic monitoring apparatus of Supplemental Note 2, wherein the processor is configured to determine a first size of a first patch of the plurality of patches different from a second size of a second patch of the plurality of patches.

Supplemental Note 4

The traffic monitoring apparatus of Supplemental Note 1, wherein the processor is further configured to generate instructions for outputting the at least one traffic flow property to an external device for managing the roadway.

Supplemental Note 5

The traffic monitoring apparatus of Supplemental Note 1, wherein the processor is further configured to determine a location of a bridge on the roadway.

Supplemental Note 6

The traffic monitoring apparatus of Supplemental Note 5, wherein the processor is configured to determine the location of the bridge based on the preprocessed waterfall data.

Supplemental Note 7

The traffic monitoring apparatus of Supplemental Note 5, wherein the processor is configured to determine the location of the bridge by comparing the amplitude of the vibration for each patch of the plurality of patches with a predetermined threshold.

Supplemental Note 8

The traffic monitoring apparatus of Supplemental Note 5, wherein the processor is further configured to determine a size of an overlap region over the preprocessed waterfall data adjacent to the determined location of the bridge.

Supplemental Note 9

The traffic monitoring apparatus of Supplemental Note 5, wherein the processor is further configured to align an edge of a first patch of the plurality of patches with an edge of the determined location of the bridge.

Supplemental Note 10

A traffic monitoring apparatus includes a distributed acoustic sensor (DAS) for acquiring waterfall data, wherein the waterfall data includes a generation position of a vibration on a roadway adjacent to the DAS, a generation time of the vibration, and an amplitude of the vibration. The traffic monitoring apparatus further includes a processor connected to the DAS. The processor is configured to receive the waterfall data from the DAS. The processor is further configured to preprocess the waterfall data. The processor is further configured to estimate a parameter of the roadway based on the preprocessed waterfall data. The processor is further configured to separate the preprocessed waterfall data into a plurality of patches, wherein a size of each of the plurality of patches is based on the estimated parameter of the roadway. The processor is further configured to process each of the plurality of patches to estimate a least one traffic flow property of the roadway.

Supplemental Note 11

The traffic monitoring apparatus of Supplemental Note 10, wherein the estimated parameter of the roadway is a location of a bridge on the roadway.

Supplemental Note 12

The traffic monitoring apparatus of Supplemental Note 11, wherein the processor is configured to determine the location of the bridge based on the preprocessed waterfall data.

Supplemental Note 13

The traffic monitoring apparatus of Supplemental Note 11, wherein the processor is configured to determine the location of the bridge by comparing the amplitude of the vibration for each patch of the plurality of patches with a threshold.

Supplemental Note 14

The traffic monitoring apparatus of Supplemental Note 13, wherein the processor is further configured to determine the threshold based on empirical data from the preprocessed waterfall data.

Supplemental Note 15

The traffic monitoring apparatus of Supplemental Note 13, wherein the processor is further configured to receive the threshold as a user input.

Supplemental Note 16

The traffic monitoring apparatus of Supplemental Note 11, wherein the processor is further configured to determine a size of an overlap region over the preprocessed waterfall data adjacent to the determined location of the bridge.

Supplemental Note 17

The traffic monitoring apparatus of Supplemental Note 11, wherein the processor is further configured to align an edge of a first patch of the plurality of patches with an edge of the determined location of the bridge.

Supplemental Note 18

A traffic monitoring method includes acquiring waterfall data, wherein the waterfall data includes a generation position on a roadway of a vibration, a generation time of the vibration, and an amplitude of the vibration. The method further includes preprocessing the waterfall data. The method further includes separating the preprocessed waterfall data into a plurality of patches, wherein a first patch of the plurality of patches has a first size, and a second patch of the plurality of patches has a second size different from the first size. The method further includes processing each of the plurality of patches to estimate at least one traffic flow property of the roadway.

Supplemental Note 19

The method of Supplemental Note 18, further comprising determining a location of a bridge on the roadway.

Supplemental Note 20

The method of Supplemental Note 19, wherein determining the location of the bridge comprises comparing the amplitude of vibration for each patch of the plurality of patches with a threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A traffic monitoring apparatus comprising:
a distributed acoustic sensor (DAS) for acquiring waterfall data, wherein the waterfall data includes a generation position of a vibration on a roadway adjacent to the DAS, a generation time of the vibration and an amplitude of the vibration; and
a processor connected to the DAS, wherein the processor is configured to:
receive the waterfall data from the DAS,
preprocess the waterfall data,
separate the preprocessed waterfall data into a plurality of patches, wherein a size of each patch of the plurality of patches is determined based on a parameter of the roadway, and the plurality of patches comprises a bridge patch corresponding to a bridge on the roadway, and
process each of the plurality of patches to estimate at least one traffic flow property of the roadway, wherein estimating the at least one traffic flow property of the roadway comprises estimating a traffic flow property of the bridge on the roadway by comparing traffic flow properties of regions on both sides of the bridge.

2. The traffic monitoring apparatus of claim 1, wherein the processor is further configured to determine a size for each patch of the plurality of patches.

3. The traffic monitoring apparatus of claim 2, wherein the processor is configured to determine a first size of a first patch of the plurality of patches different from a second size of a second patch of the plurality of patches.

4. The traffic monitoring apparatus of claim 1, wherein the processor is further configured to generate instructions for outputting the at least one traffic flow property to an external device for managing the roadway.

5. The traffic monitoring apparatus of claim 1, wherein the processor is further configured to determine a location of the bridge on the roadway.

6. The traffic monitoring apparatus of claim 5, wherein the processor is configured to determine the location of the bridge based on the preprocessed waterfall data.

7. The traffic monitoring apparatus of claim 5, wherein the processor is configured to determine the location of the bridge by comparing the amplitude of the vibration for each patch of the plurality of patches with a predetermined threshold.

8. The traffic monitoring apparatus of claim 5, wherein the processor is further configured to determine a size of the regions on both sides of the bridge.

9. The traffic monitoring apparatus of claim 5, wherein the processor is further configured to align an edge of a first patch of the plurality of patches with an edge of the determined location of the bridge.

10. A traffic monitoring apparatus comprising:
a distributed acoustic sensor (DAS) for acquiring waterfall data, wherein the waterfall data includes a generation position of a vibration on a roadway adjacent to the DAS, a generation time of the vibration, and an amplitude of the vibration; and
a processor connected to the DAS, wherein the processor is configured to:
receive the waterfall data from the DAS,
preprocess the waterfall data,
estimate a parameter of the roadway based on the preprocessed waterfall data,
separate the preprocessed waterfall data into a plurality of patches, wherein a size of each of the plurality of patches is based on the estimated parameter of the roadway, and the plurality of patches comprises a bridge patch corresponding to a bridge on the roadway, and
process each of the plurality of patches to estimate a least one traffic flow property of the roadway, wherein estimating the at least one traffic flow property of the roadway comprises estimating a traffic flow property of the bridge on the roadway by comparing traffic flow properties of regions on both sides of the bridge.

11. The traffic monitoring apparatus of claim 10, wherein the estimated parameter of the roadway is a location of the bridge on the roadway.

12. The traffic monitoring apparatus of claim 11, wherein the processor is configured to determine the location of the bridge based on the preprocessed waterfall data.

13. The traffic monitoring apparatus of claim 11, wherein the processor is configured to determine the location of the bridge by comparing the amplitude of the vibration for each patch of the plurality of patches with a threshold.

14. The traffic monitoring apparatus of claim 13, wherein the processor is further configured to determine the threshold based on empirical data from the preprocessed waterfall data.

15. The traffic monitoring apparatus of claim 13, wherein the processor is further configured to receive the threshold as a user input.

16. The traffic monitoring apparatus of claim 11, wherein the processor is further configured to determine a size of the regions on both sides of the bridge.

17. The traffic monitoring apparatus of claim 11, wherein the processor is further configured to align an edge of a first patch of the plurality of patches with an edge of the determined location of the bridge.

18. A traffic monitoring method comprising:
acquiring waterfall data, wherein the waterfall data includes a generation position on a roadway of a vibration, a generation time of the vibration, and an amplitude of the vibration;
preprocessing the waterfall data;
separating the preprocessed waterfall data into a plurality of patches, wherein a first patch of the plurality of patches has a first size, a second patch of the plurality of patches has a second size different from the first size, and the plurality of patches comprises a bridge patch corresponding to a bridge on the roadway; and
processing each of the plurality of patches to estimate at least one traffic flow property of the roadway, wherein estimating the at least one traffic flow property of the roadway comprises estimating a traffic flow property of the bridge on the roadway by comparing traffic flow properties of regions on both sides of the bridge.

19. The method of claim 18, further comprising determining a location of the bridge on the roadway.

20. The method of claim 19, wherein determining the location of the bridge comprises comparing the amplitude of vibration for each patch of the plurality of patches with a threshold.

* * * * *